United States Patent [19]

Homan et al.

[11] 4,272,623

[45] Jun. 9, 1981

[54] MERCAPTOORGANOPOLYSILOXANE ELASTOMERS CATALYZED BY METALLIC COMPOUNDS IN THE PRESENCE OF PEROXIDES

[75] Inventors: Gary R. Homan; Chi-Long Lee, both of Midland, Mich.

[73] Assignee: Dow Corning Corporation, Midland, Mich.

[21] Appl. No.: 99,298

[22] Filed: Dec. 3, 1979

[51] Int. Cl.³ ............................................. C08G 77/06
[52] U.S. Cl. ..................................... 528/15; 260/18 S; 260/37 SB; 528/19; 528/24; 528/30; 528/43
[58] Field of Search ................... 528/15, 19, 24, 43, 528/30; 260/37 SB, 18 S

[56] References Cited

U.S. PATENT DOCUMENTS

| | | | |
|---|---|---|---|
| 3,445,419 | 5/1969 | Vanderlinde | 260/37 |
| 3,655,713 | 4/1972 | Le Grow | 260/448.2 N |
| 3,816,282 | 6/1974 | Viventi | 204/159.13 |
| 3,873,499 | 3/1975 | Michael et al. | 260/45.95 E |
| 4,039,504 | 8/1977 | Homan et al. | 260/37 SB |
| 4,039,505 | 8/1977 | Homan et al. | 260/37 SB |
| 4,064,027 | 12/1977 | Gant | 204/159.13 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |

FOREIGN PATENT DOCUMENTS 2008426 10/1970 Fed. Rep. of Germany.

*Primary Examiner*—Melvyn I. Marquis
*Attorney, Agent, or Firm*—Roger H. Borrousch

[57] ABSTRACT

Mixing mercaptoorganopolysiloxanes with a selected transition metal compound, an organic peroxide and optionally a filler, provides useful new compositions such as materials curable to elastomers at room temperature.

8 Claims, No Drawings

MERCAPTOORGANOPOLYSILOXANE ELASTOMERS CATALYZED BY METALLIC COMPOUNDS IN THE PRESENCE OF PEROXIDES

BACKGROUND OF THE INVENTION

1. Field of the Invention

This invention relates to compositions including siloxane polymers and siloxane elastomers containing sulfur.

2. Description of the Prior Art

Applicants' U.S. Pat. Nos. 4,039,504 and 4,039,505 are generally directed to compositions curable to elastomers at room temperature or with heat. These compositions are prepared from mixtures of certain polymethylvinylsiloxanes and mercaptoorganopolysiloxanes with an organic peroxide, and optionally a filler.

Applicants' U.S. Pat. No. 4,070,329 discloses compositions prepared from mixtures of mercaptoorganopolysiloxanes, and organic peroxide catalysts. Applicants' U.S. Pat. No. 4,070,328 discloses compositions prepared from mixtures of mercaptoorganopolysiloxanes, organic hydroperoxide, and selected nitrogen compounds. The compositions prepared according to these references can be used as sealants which rapidly cure to elastomers with non-tacky surfaces.

Numerous other prior art references are directed to compositions involving mercaptoorganopolysiloxanes and mixtures thereof with alkenyl-containing siloxanes as well as to curing systems employing electromagnetic and particulate radiation. These references include: U.S. Pat. No. 3,445,419; U.S. Pat. No. 3,816,282; U.S. Pat. No. 3,873,499; German Patent Publication (OLS) 2,008,426; U.S. Pat. No. 4,064,027; U.S. Pat. No. 4,066,603; and, U.S. patent application Ser. No. 663,326, filed Mar. 3, 1976, by Gary N. Bokerman and Robert E. Kalinowski, entitled "Method of Curing Thick Section Elastomers" and assigned to the same assignee as the present invention and now abandoned. The disclosures of the above-identified patents and applications are specifically incorporated by reference herein for the purpose of exemplifying the state of the prior art.

Although the prior art describes elastomeric materials formed by mixing mercaptoorganopolysiloxanes with alkenyl-containing polysiloxanes and organic peroxides, by mixing mercaptoorganopolysiloxanes with organic peroxides alone, or by mixing mercaptoorganopolysiloxanes with organic hydroperoxides and selected nitrogen compounds, it was not expected that certain selected transition metal compounds, when provided in mixtures of mercaptoorganopolysiloxanes and organic peroxides would substantially accelerate the rate of curing of the mixture to provide elastomeric compositions.

SUMMARY OF THE INVENTION

According to the present invention, novel compositions of matter are provided by mixing mercaptoorganopolysiloxanes with selected transition metal compounds and organic peroxides. Included among the compositions provided according to the invention are compositions curable to elastomers at room temperature in the presence or absence of an oxygen-containing atmosphere such as air. Curable compositions of the invention may optionally include fillers and provide sealants which cure rapidly to elastomeric materials with non-tacky surfaces in a small fraction of the time necessary for curing of mixtures of mercaptoorganopolysiloxanes and peroxides which do not include the metallic compound.

DESCRIPTION OF THE INVENTION

This invention relates to compositions of matter consisting essentially of materials prepared by mixing (A) a mercaptoorganopolysiloxane consisting essentially of a combination of units selected from dimethylsiloxane units, trimethylsiloxane units, hydroxydimethylsiloxane units, units of the formula

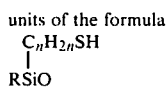

units of the formula

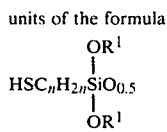

units of the formula

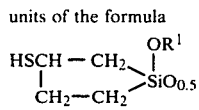

units of the formula

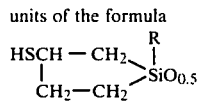

units of the formula

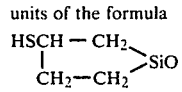

and units of the formula

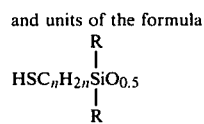

wherein: R is a monovalent radical selected from the group consisting of alkyl radicals of from 1 to 3 carbon atoms inclusive and phenyl radical; $R^1$ is methyl or ethyl; and, n has a value of from 1 to 4 inclusive, there being in said mercaptoorganopolysiloxane an average of greater than two mercapto-containing siloxane units per molecule and no more than 10 mole percent mercapto-containing siloxane units based on the total number of siloxane units in the mercaptoorganopolysiloxane;

(B) an organic peroxide in an amount equal to from 0.5 to about 6 parts by weight per 100 parts by weight of (A);

(C) a transition metal compound selected from among those which react to provide oxidized metal ions in the presence of (B) and reduced metal ions in the presence of (A), in an amount of from about 0.1 to about 10 parts by weight of (A); and (D) a filler in an amount of from 0 to 200 parts by weight per 100 parts by weight of (A).

The mercaptoorganopolysiloxanes useful in practice of the present invention include those consisting essentially of dimethylsiloxane units, trimethylsiloxane units, hydroxydimethylsiloxane units, and units represented by the formulas

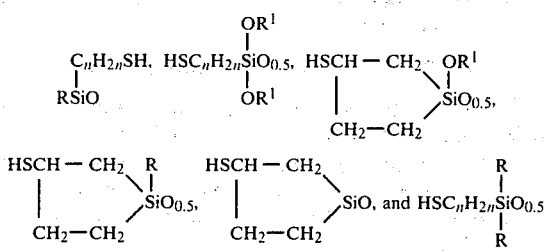

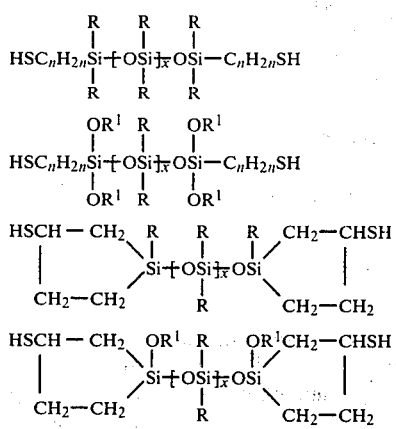

wherein: R is a monovalent radical selected from the group consisting of alkyl radicals of from 1 to 3 carbon atoms inclusive (such as methyl, ethyl and propyl) and phenyl radical; $R^1$ is methyl or ethyl; and n has a value of from 1 to 4 inclusive and preferably has a value of 3, there being present in such mercaptoorganopolysiloxanes an average of at least two mercapto-containng siloxane units per molecule and no more than 10 mole percent mercapto-containing siloxane units based on the total units in the mercaptoorganopolysiloxane.

Examples of the mercaptoorganopolysiloxanes include those having "terminal" mercapto groups such as those represented by the formulas I through IV:

$$\underset{R}{\overset{R}{\underset{|}{HSC_nH_{2n}Si}}}\!\!\!\overset{R}{\underset{|}{-(OSi)_{\overline{x}}OSi}}\!\!\!\overset{R}{\underset{|}{-C_nH_{2n}SH}} \quad \text{I}$$

$$\underset{OR^1}{\overset{OR^1}{\underset{|}{HSC_nH_{2n}Si}}}\!\!\!\overset{R}{\underset{|}{-(OSi)_{\overline{x}}OSi}}\!\!\!\overset{OR^1}{\underset{|}{-C_nH_{2n}SH}} \quad \text{II}$$

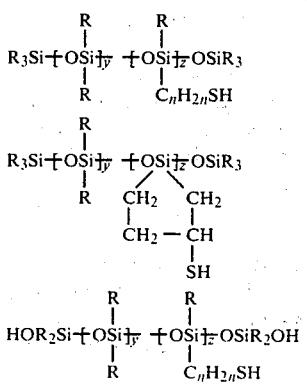

wherein, R, $R^1$ and n are as defined above and x has a value of from 18 to 1000 and preferably 200 to 800, and those having "pendant" mercapto groups such as those represented by formulas V through VIII:

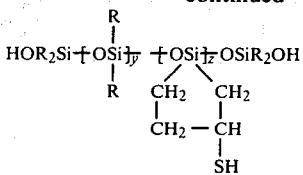

-continued

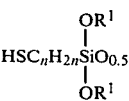

wherein n and R are as above; y+z has a value of from 18 to 1000 and preferably 200 to 800, and z is greater than 2 and no more than a number providing 10 mole percent mercapto-containing siloxane units, based on total siloxane units in the polymer.

The mercaptoorganopolysiloxanes of formulas I and V are known in the art as evidenced by the prior art cited herein. The mercaptosilacyclopentylpolysiloxanes of formulas III and VI and their position isomers can be prepared by the method defined in U.S. Pat. No. 3,655,713, which is hereby incorporated by reference to show the mercaptosilacyclopentylpolysiloxanes and their preparation. The mercaptoorganopolysiloxanes of formula II which contain endblocking units of the formula

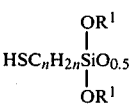

can be prepared by reacting a hydroxyl endblocked polydimethylsiloxane and a mercaptoalkyltrialkoxysilane of the formula

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 mole percent over stoichiometric amounts. The resulting product is essentially a polydimethylsiloxane endblocked with the units of the formula $$\underset{OR^1}{\overset{OR^1}{\underset{|}{HSC_nH_{2n}SiO_{0.5}}}}$$

but there may be some small amounts of units wherein two SiOH groups have reacted with one mercaptoalkyltrialkoxysilane molecule, but these amounts are small enough that the character of the endblocked polydimethylsiloxane is not noticeably altered.

Metallic compounds useful in the practice of the present invention include compounds of selected transition metals capable of participating in a "redox" equilibrium reaction with the peroxide oxidizing agent and thiol reducing agent.

A first group of transition metal compounds useful in the practice of the present invention comprises inorganic salts of iron, copper, and cobalt. Included are ferrous and ferric compounds such as ferrous chloride, ferric oxide, and ferrous ammonium sulfate. Also included are cuprous and cupric compounds such as cuprous chloride and cupric sulfate. Preferred transition metal compounds are ferric oxide and cupric sulfate. Cobalt compounds such as cobaltous chloride (hexahydrate) are also useful.

A second group of transition metal compounds useful in the practice of the invention are carbonyls of iron, manganese, nickel and cobalt such as $Fe(CO)_5$, $Fe_2(CO)_9$, $Fe_3(CO)_{12}$, $Mn_2(CO)_{10}$, $Ni(CO)_4$ and $Co_2(CO)_{10}$.

A third group of transition metal compounds useful in practice of the invention consists of metallocenes having the formula

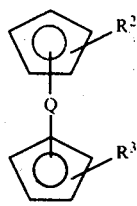

wherein Q is iron, nickel or cobalt, and $R^2$ and $R^3$ are the same or different and selected from the group consisting of hydrogen, lower ($C_1$ to $C_3$) alkyl, acetyl, carboxyl, vinyl or trimethylsilyl. Preferred compounds include ferrocene and cobaltocene.

A fourth group of transition metal compounds useful in practice of the invention consists of cyclopentadienyl carbonyl compounds having the formula

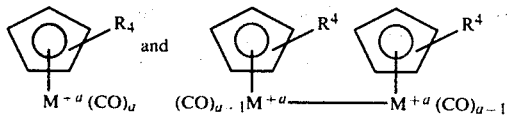

wherein M is iron, nickel or manganese, a is from 2 to 3 depending on the oxidation state of M, and $R^4$ is hydrogen, lower ($C_1$ to $C_3$) alkyl, acetyl, carboxyl, vinyl or trimethylsilyl. Preferred compounds also include dimeric forms of the above compounds such as cyclopentadienyl iron dicarbonyl dimer.

A fifth group of transition metal compounds useful in the practice of the invention are transition metal salts of carboxylic acids represented by the formula, $$T(OR^5)_m$$

Wherein: T is a transition metal selected from the group consisting of iron, manganese, cobalt, copper and nickel; $R^5$ is a monovalent acyl radical; and m is 2 or 3 depending upon the most stable oxidation state of T. Suitable monovalent acyl radicals include acetyl, propionyl, isobutyryl, stearoyl, lauroyl, 2-ethylhexanoyl (sometimes referred to as "octanoyl"), oleoyl, linoleoyl, benzoyl, naphthoyl, β-benzoylpropionyl, crotonoyl atropoyl, palmitoyl, and cinnamoyl. The 2-ethylhexanoyl ("octanoyl") radical is the preferred acyl radical. The most preferred compound is ferric octoate.

Mixtures including the above-noted compounds exhibit a significant increase in the rate of reaction as evidenced by the marked reduction in the time to achieve a cure in the elastomeric compounds. Preferred quantities of metallic compound for use in the mixtures range from about 0.1 to about 10.0 parts by weight per 100 parts by weight of polymer.

One or more of the following conventional organic peroxides can be used in the practice of the invention: 2,4-dichlorobenzoyl peroxide; tertiary-butyl perbenzoate; benzoyl peroxide; tertiary-butyl peroctoate (2-ethyl-hexoate); paramenthane hydroperoxide; t-butyl hydroperoxide and cumene hydroperoxide. The quantity of organic peroxide used in combination with the mercaptoorganopolysiloxane can vary over a broad range depending upon the degree of mercapto groups on the mercaptoorganopolysiloxane that one wishes to react. For the optimum physical properties for cured elastomer products, one should use the peroxide in an amount sufficient to provide a ratio of moles of peroxide molecules to mercapto groups of at least 1:2 and the amounts by weight fall in the range of about 1 to about 6 parts by weight per 100 parts by weight of mercaptoorganopolysiloxane. As shown in the examples below, organic peroxides including a peroxyester function are much preferred to peroxides not containing such groups.

When the metallic compounds are incorporated with a mercaptoorganopolysiloxane and an organic peroxide in mixtures of the invention, the compound acts as an accelerator to increase the rate of reaction between the mercaptoalkyl radical of the mercaptoorganopolysiloxane and the organic peroxide, which results in the more rapid formation of —S—S— covalent bonds. The formation of such —S—S— bonds in the practice of the invention may be verified by nuclear magnetic resonance (NMR) analysis of a model system wherein 3-mercaptopropylheptamethyltrisiloxane serves as a model mercaptoorganopolysiloxane and is mixed with ferric oxide and dibenzoyl peroxide to exclusively yield the appropriate disulfide compound upon standing at room temperature.

The use in compositions of the invention of mercaptoorganopolysiloxanes exclusively of formulas I through IV will result in the formation of linear gums while the use of mercaptoorganopolysiloxanes of formulas V through VIII—alone or in combination with polymers of formulas I through IV—will result in the formation of elastomeric materials.

Fillers can be used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate. The curable elastomeric compositions preferably contain filler up to about 200 parts by weight per 100 parts by weight mercaptoorganopolysiloxanes.

The compositions of this invention which cure to elastomers do so rapidly at room temperature in the presence of an oxygen-containing atmosphere such as air. The resulting elastomer has a dry or non-tacky surface. Air inhibition such as is observed with conventional non-mercapto-containing peroxide cured silicone rubber composition is not observed and the inhibition by various materials such as sulfur and phosphorus as observed in platinum catalyzed compositions containing aliphatic unsaturated siloxanes and SiH-containing siloxanes, is not observed. Rapidly curing elastomers of the invention are expected to be exceptionally useful sealants and can be provided packaged as a two part system.

The following examples are presented for illustration purposes and should not be construed as limiting the invention. Examples 1 through 25 are generally directed to the use of the first-mentioned group of transition metal compounds.

EXAMPLE 1

A mercaptoorganopolysiloxane of the type exemplified by formula V and having approximately a 1.0 mole percent ratio of methylmercaptopropylsiloxane units to dimethylsiloxane units was prepared according to the following procedure. A mixture of 53.65 g of a hydrolyzate of methylmercaptopropyldimethoxysilane and 12.97 g of hexamethyldisiloxane was heated in a 5000 ml three-necked flask fitted with a reflux condenser, a stirrer and a thermometer. When the temperature of the mixture reached 70° C., 1.5 g of trifluoromethanesulfonic acid was added and the mixture was stirred for one-half hour while heating to 85° C. With the temperature maintained at 85° C., 2933.37 g of an octamethylcyclotetrasiloxane was gradually added over a period of about 2 hours through the reflux condenser by means of a pressure compensated funnel. After the addition was complete, 0.18 g of water was added and the mixture was allowed to equilibrate for about 5 hours. Fifteen grams of sodium carbonate was added and the mixture was stirred for about 1 hour. Two liters of toluene were admixed and filtered through a charcoal filter. The volatiles were stripped off at 150° C. (at less than 667 Pa pressure) to provide approximately 3000 g of a polymer having a viscosity of about 0.0052 m$^2$/s at 25° C. The polymer may be represented by the general formula,

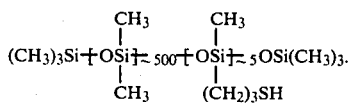

Analysis of the polymer by iodine titration revealed about 0.49 weight percent —SH (or 0.0148 moles —SH/100 g polymer).

EXAMPLE 2

A mercaptoorganopolysiloxane of the type exemplified by formula V and having approximately 1.0 mole percent ratio of methylmercaptopropylsiloxane units to dimethylsiloxane units was prepared by the same procedure as Example 1. The polymer had a viscosity of 0.022 m$^2$/s at 22° C. and may be represented by the formula,

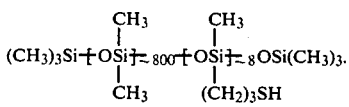

Analysis of the polymer by iodine titration revealed about 0.44 weight percent —SH.

EXAMPLE 3

A mixture of 100 parts by weight of the polymer of Example 2 and 1 part by weight cuprous chloride was prepared on a 3-roll mill. A sample of this mixture was placed in a 150° C. oven. The heated mixture was surface-cured after 15 minutes and completely cured in 24 hours. Snap time is defined as the length of time required for a composition to obtain recovery properties. When the phrase "cured to a snap" is used herein, it refers to the point in the curing process when a composition shows recovery properties. A sample left at room temperature was cured to a snap in 48 hours; was fairly well cross-linked but had a tacky surface after 4 days; and was fully cured with a slightly tacky surface after 2 weeks. This example is presented for comparative purposes.

EXAMPLE 4

Ten grams of the polymer/cuprous chloride mixture of Example 3 was mixed with 0.5 g of t-butyl hydroperoxide to provide a mixture which cured at room temperature to a snap in 35 seconds and was tack-free in about 5 minutes.

EXAMPLE 5

Ten grams of the polymer/cuprous chloride mixture of Example 3 was mixed with 0.1 g t-butyl hydroperoxide to provide a mixture which cured at room temperature to a snap in 65 seconds and was totally tack-free in less than 48 hours.

EXAMPLE 6

One hundred grams of the polymer of Example 2 was mixed with 3 g of ferric oxide on a 3-roll mill. Samples of the red colored mixture displayed no signs of curing when left at room temperature for more than 6 months. This example is presented for comparative purposes.

EXAMPLE 7

Two separate 10 g samples of the mixture of Example 6 were mixed with 0.5 and 0.1 g t-butyl hydroperoxide respectively. The mixtures cured at room temperature to elastomers having respective snap times of 5 and 50 minutes respectively. Both mixtures were still slightly tacky after 3 days at room temperature.

EXAMPLE 8

One hundred parts by weight of the polymer of Example 2 was mixed with one part by weight ferrous chloride tetrahydrate on a 3-roll mill. A sample of the translucent, pale yellow mixture was placed in at 150° C. oven. The mixture was surface cured in 30 minutes and completely cured in less than 16 hours to give a black, highly cross-linked elastomer. A sample left at room temperature displayed a skin at about 2 weeks but showed no evidence of curing under the skin. This example is presented for comparative purposes.

EXAMPLE 9

Ten grams of the polymer/ferrous chloride mixture of Example 8 was mixed with 0.5 g of t-butyl hydroperoxide. Upon mixing the color changed from pale yellow to orange-yellow and provided a material which cured at room temperature to a snap in from 12 to 20 minutes. The material had a dry surface in about 30 minutes and was fully cured in about 24 hours at room temperature.

EXAMPLE 10

A mixture of 100 parts by weight of the polymer of Example 2 and 1 part by weight of ferrous ammonium sulfate hexahydrate was prepared on a 3-roll mill. A sample was placed in a 150° C. oven and did not display any evidence of curing after 2 weeks. This example is presented for comparative purposes.

EXAMPLE 11

Ten grams of the mixture of Example 10 was mixed with 0.5 g of t-butyl hydroperoxide. The resulting mixture exhibited only slight thickening after 3 days at room temperature.

EXAMPLE 12

Ten grams of the polymer/ferric oxide mixture of Example 6 was mixed with 0.5 g of t-butyl perbenzoate to provide a mixture which cured at room temperature to a snap in 65 seconds and was totally tack-free in less than 3 minutes.

EXAMPLE 13

Ten grams of the polymer/ferric oxide mixture of Example 6 was mixed with 0.1 g of t-butyl perbenzoate to provide a mixture which cured at room temperature to a snap in 5.25 minutes, was very slightly tacky at 13 minutes and was tack-free in about 16 minutes.

EXAMPLE 14

Ten grams of the polymer/ferric oxide mixture of Example 6 was mixed with 0.05 g of t-butyl perbenzoate to provide a mixture which cured to a snap in 16 minutes and displayed a tack-free surface after 45 minutes at room temperature.

EXAMPLE 15

Ten grams of the polymer/ferric oxide mixture of Example 6 was mixed with 0.01 g of t-butyl perbenzoate. A sample was placed in a 150° C. oven and snapped after 3 minutes of heat treatment. Continuing heat treatment resulted in a substantially cured, but stringly elastomer after 1 month. This example is presented for comparative purposes.

EXAMPLE 16

To 100 grams of a polymer/ferric oxide mixture prepared according to Example 6 was added 5 g of t-butyl perbenzoate. The material snapped in 65 seconds at room temperature and was completely cured in 3 minutes.

EXAMPLE 17

A sample of 10 g of the polymer/ferric oxide mixture of Example 6 was mixed with 1.0 g of 2,4-dichlorobenzoyl peroxide (50% solution in low molecular weight polydimethylsiloxane polymer). A sample was placed in a 150° C. oven and cured completely, with a tack-free, glossy surface, in less than 3 minutes. Another sample left at room temperature had a snap time of about 1 hour and was still tacky after 3 hours. This sample was tack-free after standing at room temperature for three days.

EXAMPLE 18

One hundred grams of the polymer of Example 2 was mixed with 3 g of cupric sulfate. To four 10 g samples of this mixture was respectively added 0.5 g, 0.1 g, 0.05 g and 0.02 g t-butyl perbenzoate. The first sample had a snap time of 1.5 minutes and was completely cured with a dry surface in 2.5 minutes at room temperature. The second sample had a snap time of 7.25 minutes and was completely cured at room temperature with a dry surface in 14 minutes. The third sample had a snap time of about 18 minutes, was slightly tacky after 3 hours, and was substantially cured to a low modulus material after 18 hours at room temperature. The fourth sample did not cure to a snap after 18 hours of standing at room temperature. The fourth sample is presented for comparative purposes.

EXAMPLE 19

A mercaptoorganopolysiloxane of the type exemplified by formula I and having approximately a 1.5 mole percent ratio of dimethylmercaptopropylsiloxane units to dimethylsiloxane units was prepared according to the following procedure. A mixture of 74.85 g of tetramethyldimercaptopropyldisiloxane and 3305.45 g of dimethylsiloxane cyclic tetramer was heated in a five-liter flask fitted with a condenser, stirrer, thermometer and nitrogen gas purge. The system was purged with nitrogen gas while the mixture was heated with stirring to 60° C., whereupon 1.77 ml of trifluoromethanesulfonic acid solution (1.696 g/ml) was added. The polymerization reaction was allowed to proceed for 4 hours. Thirty grams of sodium bicarbonate was added and the mixture was allowed to neutralize for 3 hours while cooling. The polymer was filtered and volatiles were stripped off at 150° C. (at about 200 Pa pressure) to provide approximately 3000 g of a polymer having a viscosity of about 0.467 Pa.s at 25° C. Analysis of the polymer by iodine titration revealed about 0.63 weight percent —SH (0.0191 moles —SH/ 100 g polymer).

EXAMPLE 20

A mercaptoorganopolysiloxane of the type exemplified by formula V and having approximately a 5.0 mole percent ratio of methylmercaptopropylsiloxane units to dimethylsiloxane units was prepared according to the procedure described in Example 1. The polymer may be represented by the general formula

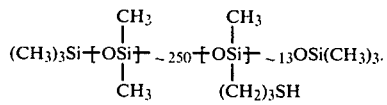

Analysis of the polymer by iodine titration revealed about 2.3 weight percent —SH.

EXAMPLE 21

On a 3-roll mill, a mixture was prepared with: 100 parts by weight of the polymer of Example 19 milled with 1 part by weight magnesium oxide; 3 parts by weight cupric sulfate; and 0.5 parts by weight GD 2417 ® [(violet) mercaptan masking compound]. To 20 g of the above-prepared mixture was added 0.5 g t-butyl perbenzoate and 0.5 g of the polymer of Example 20. A sample of this mixture was completely cured in about 45 minutes at room temperature. Another sample was completely cured in 2 minutes when heated to 150° C.

EXAMPLE 22

A mixture of 100 g of the polymer of Example 2 and 1 g of cobaltous chloride (hexahydrate) was prepared on a 3-roll mill. To this mixture was added 0.5 g of t-butyl hydroperoxide. The material was slightly gelled after 48 hours at room temperature and cured to a low durometer rubber after 1 week at room temperature.

It should be apparent from the foregoing examples that ferrous, ferric, cuprous and cupric compounds provide useful elastomers when provided in mixtures of mercaptoorganopolysiloxanes having terminal and internal mercapto functional groups with organic peroxides of the peroxyester type and hydroperoxides such as t-butyl perbenzoate, 2,4-dichlorobenzoyl peroxide and t-butyl hydroperoxide. Such mixtures may be provided in a conventional 2-part packaging system with one component comprising, e.g., a terminal mercapto group-containing polymer, an internal mercapto group-containing polymer, and metal compound and the other component comprising the peroxide. In instances wherein it is desired to provide an acid acceptor substance such as magnesium oxide in the mixtures, a 3-part packaging system may be employed.

The example immediately following illustrates the general ineffectiveness of magnesium compounds as catalysts in practice of the invention as well as the general ineffectiveness of alkyl peroxides in rapidly providing room temperature cures.

EXAMPLE 23

A mixture of 100 g of the polymer of Example 2 and 1 g of magnesium sulfate was prepared on a 3-roll mill. A sample of the mixture showed no evidence of curing after 24 hours at 150° C. Another 10 g sample of the mixture was mixed with 0.5 g of t-butyl hydroperoxide. The sample showed no evidence of curing after three days at room temperature. This example is presented for comparative purposes.

EXAMPLE 24

Ten grams of the polymer of Example 1 was mixed with 0.5 g of 2,5-dimethyl-2,5-di(t-butylperoxy) hexane (Lupersol®101). A sample left to stand at room temperature for one month was still flowable. Another sample was placed in a 150° C. oven and cured to a tack-free material in about 1 hour. This example is presented for comparative purposes.

EXAMPLE 25

This example illustrates the effects of formulation variables [i.e., (1) polymer molecular weight, (2) levels of "crosslinker" (internal mercaptopropyl group-containing polymer), (3) peroxide, (4) filler and (5) metal compound accelerator] on the physical property profile of elastomers prepared according to the invention.

Two types of polymers were employed, i.e., a mercaptopropyl endblocked linear polymer of the type exemplified by formula I and a "crosslinker" polymer as defined by Example 20. The latter was prepared according to the process described in Example 1. Five polymers of the type represented by formula I were prepared according to the process described in Example 19. The viscosities and the number average molecular weights analyzed by Gel Permeation Chromatography (GPC) of these polymers were as shown below.

| Polymer | GPC $\overline{M}_n$ | Viscosity (m²/s) |
|---|---|---|
| A | 40,770 | .040500 |
| B | 35,880 | .014080 |
| C | 23,100 | .002560 |
| D | 9,000 | .000467 |
| E | 6,200 | .000163 |

A. Effect of Polymer Molecular Weight

Each of polymers A through E was formulated into an identical base formulation, i.e.:
100 parts polymer
30 parts treated silica (fume silica having triorganosiloxy groups)
3 parts ferric oxide (accelerator)
2 parts magnesium oxide (acid acceptor).
To 100 parts of the base formulation, there was added a varying number of parts of the crosslinker polymer as prepared in Example 20 and 2.5 parts t-butyl perbenzoate (curing agent).

The effects of polymer molecular weight on physical property profiles observed were as shown in Tables 1 through 5. In general, as the polymer molecular weight was decreased, the ultimate elongation decreased whereas the durometer increased.

TABLE 1

Physical Properties with Polymer A

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 2.5 | 15 mins. | ~30 mins. | 12 | 2.2 | 1270 | 9.5 | 0.21 | 0.29 | 0.52 |
| 5.0 | 30 mins. | ~45 mins. | 12 | 2.8 | 1130 | 11.9 | 0.26 | 0.47 | 0.83 |
| 7.5 | 40 mins. | ~1.5 hrs. | 14 | 2.7 | 990 | 9.6 | 0.28 | 0.60 | 1.05 |
| 10.0 | 50 mins. | ~1.75 hrs. | 15 | 2.3 | 810 | 8.8 | 0.31 | 0.72 | 1.28 |
| 12.5 | 60 mins. | ~2.0 hrs. | 16 | 2.2 | 730 | 2.8 | 0.31 | 0.79 | 1.41 |

TABLE 2

Physical Properties with Polymer B

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 2.5 | 20 mins. | ~35 mins. | 16 | 3.9 | 1150 | 14.9 | 0.31 | 0.55 | 0.90 |
| 5.0 | 35 mins. | ~60 mins. | 19 | 3.3 | 950 | 13.5 | 0.34 | 0.69 | 1.17 |
| 7.5 | 45–50 mins. | ~1.5 hrs. | 20 | 2.9 | 830 | 11.4 | 0.38 | 0.86 | 1.48 |
| 10.0 | 65 mins. | ~2.1 hrs. | 24 | 2.8 | 720 | 9.6 | 0.41 | 1.00 | 1.76 |
| 12.5 | 70 mins. | ~2.1 hrs. | 26 | 2.3 | 550 | 11.0 | 0.48 | 1.21 | 2.07 |
| 25.0 | 120 mins. | 5–6 hrs. | 28 | 1.8 | 270 | 2.6 | 0.62 | — | — |

TABLE 3

Physical Properties with Polymer C

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 2.5 | 20 mins. | 30-40 mins. | 19 | 4.0 | 1030 | 17.2 | 0.37 | 0.72 | 1.15 |
| 5.0 | 35 mins. | 50-55 mins. | 23 | 3.6 | 830 | 15.8 | 0.38 | 0.86 | 1.52 |
| 7.5 | 40 mins. | 75 mins. | 22 | 3.3 | 680 | 16.1 | 0.41 | 1.07 | 2.03 |
| 10.0 | 60 mins. | ~2.0 hrs. | 25 | 2.9 | 540 | 15.1 | 0.48 | 1.37 | 2.59 |
| 12.5 | 55 mins. | ~1.3 hrs. | 27 | 3.0 | 530 | 14.4 | 0.50 | 1.38 | 2.59 |
| 25.0 | 120 mins. | ~4.0 hrs. | 34 | 1.7 | 230 | 2.3 | 0.79 | — | — |

TABLE 4

Physical Properties with Polymer D

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 2.5 | 2.0 hrs. | 2.9 hrs. | 24 | 4.9 | 310 | 16.6 | 0.43 | 0.86 | 1.55 |
| 5.0 | 2.0 hrs. | 4.0 hrs. | 28 | 3.0 | 580 | 16.5 | 0.50 | 1.17 | 2.24 |
| 7.5 | 2.0 hrs. | 5.2 hrs. | 32 | 2.6 | 450 | 11.4 | 0.62 | 1.45 | — |
| 10.0 | 2.1 hrs. | 5.5 hrs. | 31 | 2.1 | 350 | 13.0 | 0.62 | 1.65 | — |
| 12.5 | 2.5 hrs. | ~6.0 hrs. | 31 | 2.0 | 285 | 7.5 | 0.69 | — | — |
| 25.0 | 3.3 hrs. | >6<16 hrs. | over crosslinked; poor elastomer | | | | | | |

TABLE 5

Physical Properties with Polymer E

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 1.25 | 50 mins. | 1.5 hrs. | 33 | 4.1 | 665 | 17.0 | 0.57 | 1.32 | 2.50 |
| 2.5 | 50 mins. | 1.6 hrs. | 34 | 3.4 | 585 | 10.5 | 0.55 | 1.38 | — |
| 5.0 | 50 mins. | 1.7 hrs. | 36 | 2.7 | 425 | 9.6 | 0.62 | 1.69 | — |

B. Effect of Crosslinker Level

To demonstrate the effects of the level of crosslinker on the physical properties and cure rate, a base consisting of 100 parts of Polymer D of Example 25, 30 parts of treated filler, 3 parts of Fe₂O₃, 2 parts of MgO and 2.5 parts of t-butyl perbenzoate was cured at room temperature with various levels of crosslinker (the polymer of Example 20), ranging from 0 to 25 parts per 100 parts of base.

Results observed were as summarized in Table 6. It can be concluded that as the crosslinker concentration is decreased, the general property profile increases; including the cure rate.

It is interesting to note that some crosslinking occurred in the absence of the crosslinker. This phenomenon was observed either in the presence or in the absence of triorganosiloxy-treated silica filler. This behavior is due to low levels of branching in Polymer D.

TABLE 6

Effect of Crosslinker Level on Physical Properties

| pph Cross-linker | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 25.0 | 3.3 hrs. | overnight | "cheesy" -- poor cure | | | | | | |
| 12.5 | 2.5 hrs. | ~6 hrs. | 31 | 2.0 | 285 | 7.5 | 0.69 | — | — |
| 10.0 | 130 mins. | 5.5 hrs. | 31 | 2.1 | 350 | 13.0 | 0.62 | 1.65 | — |
| 7.5 | 120 mins. | 5.2 hrs. | 32 | 2.6 | 450 | 11.4 | 0.62 | 1.45 | — |
| 5.0 | 120 mins. | 4.0 hrs. | 28 | 3.0 | 580 | 16.5 | 0.50 | 1.17 | 2.24 |
| 2.5 | 120 mins. | 2.9 hrs. | 24 | 3.9 | 810 | 16.6 | 0.43 | 0.86 | 1.55 |
| 1.25 | 50 mins. | 1.6 hrs. | 22 | 4.7 | 935 | 13.5 | 0.34 | 0.79 | 1.38 |
| 0.63 | 55 mins. | 1.6 hrs. | 22 | 4.9 | 985 | 14.7 | 0.37 | 0.70 | 1.24 |
| 0.25 | 55 mins. | 1.5 hrs. | 20 | 5.2 | 1050 | 18.2 | 0.34 | 0.69 | 1.19 |
| 0.13 | 55 mins. | 1.5 hrs. | 20 | 5.2 | 1070 | 17.9 | 0.33 | 0.68 | 1.21 |
| None | 40 mins. | 1.0 hrs. | 20 | 5.1 | 1080 | 10.9 | 0.33 | 0.61 | 1.07 |

C. Effect of Fillers

Various fillers demonstrate the effect of filler type and filler loading level on the physical properties and the cure rate of the resulting elastomer.

Table 7 presents the data obtained with crushed (5μ) quartz, calcium carbonate, diatomaceous earth and treated silica, using a formulation consisting of 100 parts of a base (100 parts Polymer B, 3 parts ferric oxide, 2 parts MgO and x parts filler as indicated), 2.5 parts of the crosslinker polymer as defined in Example 20 and 2.5 parts t-butyl perbenzoate.

10 parts of the crosslinker polymer as defined in Example 20 was mixed in with Polymer C in the base formulation. As the concentration of $Fe_2O_3$ was increased, the

TABLE 7

Physical Properties with Various Fillers

| Filler | Parts Filler | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) | Extrusion Rate (g/min.) |
|---|---|---|---|---|---|---|---|---|---|---|---|
| Minusil® | 30 | 9.5 mins. | 17 mins. | 11 | 1.21 | 810 | 2.1 | 0.21 | 0.28 | 0.37 | 2.14 |
| Minusil® | 60 | 10 mins. | 18 mins. | 17 | 1.76 | 650 | 2.8 | 0.34 | 0.52 | 0.79 | 1.63 |
| Albacar® | 30 | 10 mins. | 25 mins. | 14 | 1.72 | 910 | 2.6 | 0.31 | 0.40 | 0.48 | 1.16 |
| Albacar® | 60 | 8 mins. | 23 mins. | 20 | 1.38 | 920 | 4.4 | 0.38 | 0.48 | 0.66 | 0.47 |
| Celite® 315 | 30 | 7.5 mins. | 20 mins. | 23 | 1.24 | 590 | 4.4 | 0.57 | — | 1.00 | 0.76 |
| Treated Silica | 30 | 20 mins. | 35 mins. | 16 | 3.86 | 1150 | 14.9 | 0.31 | — | 0.55 | 0.46 |

D. Effect of Peroxide Levels

The effect of peroxide level is demonstrated in Table 8. The formulation consisted of 100 parts of a base (100 parts Polymer A, 30 parts treated silica, 3 parts $Fe_2O_3$, and 2 parts MgO), x parts of the crosslinker polymer as defined in Example 20 and y parts of t-butyl perbenzoate as indicated. The overall physical properties obtained with 1.25 pph peroxide were slightly better than those with 2.5 pph peroxide. At lower peroxide levels, however, the cure rate decreased drastically as shown in the table. As long as the mole ratio of peroxide to —SH was maintained at least 1 to 2, the physical properties were not drastically affected by variations in peroxide concentration.

cure rate increased drastically. Although a complete cure time of 50 minutes was obtained at 5 pph $Fe_2O_3$ with 2.5 pph of peroxide, the complete cure time can be decreased to 20–30 minutes if the peroxide level is doubled.

Ferric oxide was utilized effectively to control the rate of cure without sacrificing the physical properties. Thus, it was feasible to obtain complete cure times ranging from 0.5 to 24 hours at room temperature by adjusting the peroxide and accelerator levels; as long as the peroxide to —SH molar ratio was at least $\frac{1}{2}$.

TABLE 9

Effects of Variations in Accelerator Level

| pph $Fe_2O_3$ | Room Temperature Snap Time | Room Temperature Complete Cure | Durometer (Shore A) | Tensile Strength (MPa) | Elongation (%) | Tear Strength (kN/m) | 100% Modulus (MPa) | 300% Modulus (MPa) | 500% Modulus (MPa) |
|---|---|---|---|---|---|---|---|---|---|
| 5.0 | 22 mins. | 50 mins. | 20 | 2.9 | 690 | 16.3 | 0.40 | 0.92 | 1.76 |
| 3.0 | 35 mins. | 80 mins. | 20 | 3.0 | 690 | 14.5 | 0.40 | 0.92 | 1.74 |
| 1.0 | 2.5 hrs. | 4.5 hrs. | 20 | 2.9 | 700 | 14.4 | 0.41 | 0.93 | 1.76 |
| 0.5 | 3.5 hrs. | 6.0 hrs. | 22 | 3.1 | 705 | 13.0 | 0.40 | 0.90 | 1.76 |
| 0.1 | 5.7 hrs. | 8.0 hrs. | 22 | 2.8 | 675 | 13.1 | 0.43 | 0.93 | 1.72 |
| None | 6.5 hrs. | 11.0 hrs. | 22 | 2.6 | 635 | 14.9 | 0.41 | 0.93 | 1.76 |

EXAMPLE 26

A mercaptoorganopolysiloxane of the type exemplified by formula V and having approximately a 0.75

TABLE 8

Effect of Varying Peroxide Concentration

| Variables Crosslinker (pph) | Variables TBPB (pph) | Room Temperature Snap Time | Room Temperature Cure Time | Durometer (Shore A) | Tensile Strength (MPa) | Elongation (&) | Tear Strength (kN/m) | 100% Modulus (MPa) | 300% Modulus (MPa) | 500% Modulus (MPa) |
|---|---|---|---|---|---|---|---|---|---|---|
| 2.5 | 1.25 | 45–60 mins. | overnight | 13 | 2.6 | 1270 | 7.2 | 0.24 | 0.34 | 0.55 |
| 2.5 | 2.50 | 15 mins. | ~30 mins. | 12 | 2.2 | 1270 | 9.5 | 0.21 | 0.29 | 0.52 |
| 5.0 | 1.25 | 90–110 mins. | overnight | 14 | 3.0 | 1120 | 10.6 | 0.27 | 0.50 | 0.84 |
| 5.0 | 2.50 | 30 mins. | ~45 mins. | 12 | 2.8 | 1130 | 11.9 | 0.26 | 0.47 | 0.83 |
| 7.5 | 1.25 | ~90 mins. | 5–18 hrs. | 16 | 3.0 | 990 | 11.4 | 0.31 | 0.66 | 1.14 |
| 7.5 | 2.50 | 40 mins. | ~1.5 hrs. | 14 | 2.7 | 990 | 9.6 | 0.28 | 0.60 | 1.05 |

F. Effect of Accelerator Levels

It has been demonstrated that peroxide levels can be reduced to slow down the rate of cure without sacrificing the physical properties of the cured elastomer. Another method of controlling the rate of cure is to vary the amount of accelerator ($Fe_2O_3$) in the formulation. This is illustrated in Table 9. Polymer C was used and mole percent ratio of methylmercaptopropylsiloxane units to dimethylsiloxane units were prepared according to the procedure described in Example 1. The polymer may be represented by the general formula

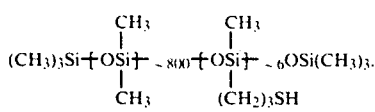

Analysis of the polymer by iodine titration revealed about 0.41 weight percent —SH. The polymer has a viscosity of 0.03893 m²/s. For comparative purposes, a mixture of 100 g of this polymer and 1 g of t-butyl perbenzoate was prepared. There was no apparent increase in viscosity until the mixture had stood at room temperature for over two days. Many days later the mixture had not completely cured.

The example immediately following illustrates the usefulness of the second of the above-noted classes of transition metal compounds in practice of the invention.

EXAMPLE 27

A mixture of 100 g of the polymer of Example 26, 1.0 of t-butyl perbenzoate and 0.5 g of solution of iron pentacarbonyl (10% in mineral oil) was prepared. The mixture cured to a snap in about two hours and was completely cured after standing for 2½ hours at room temperature.

The following Examples 28 and 29 relate to usefulness of the third of the above-noted classes of transition metal compounds in practice of the invention.

EXAMPLE 28

A mixture was prepared using 20 g of the polymer of Example 26, 1.0 g of t-butyl perbenzoate and 0.5 g of an 8 weight percent solution of ferrocene in toluene. The mixture cured at room temperature to a snap in about 110 minutes and was completely cured in about 165 minutes.

EXAMPLE 29

The procedure of Example 28 was repeated using an 8 weight percent solution of cobaltocene in toluene in place of the ferrocene solution. The mixture cured at room temperature to a snap in one minute and was completely cured in 10 minutes.

The following example relates to usefulness of the fourth of the above-noted classes of transition metal compounds in practice of the invention.

EXAMPLE 30

A mixture was prepared using 20 g of a polymer prepared according to the procedure of Example 1 and having the general formula,

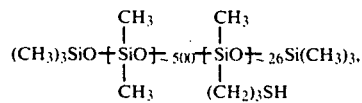

0.1 g cumene hydroperoxide and 0.1 g of cyclopentadienyliron dicarbonyl dimer (0.2 M in toluene). The material gelled immediately at room temperature, with the surface becoming dry after about 30 minutes.

The following examples illustrate usefulness of the fifth of the above-noted classes of transition metal compounds in practice of the invention.

EXAMPLE 31

A mixture was prepared having 20 g of the polymer of Example 26, 1.0 g t-butyl perbenzoate and 0.1 g manganese octoate (50% solution in mineral oil). The mixture cured at room temperature to a snap in 16 minutes and was completely cured in about 30 minutes.

EXAMPLE 32

Example 31 was repeated using 0.1 g nickel octoate solution (20% in mineral oil) in place of the manganese octoate solution. The resulting mixture cured at room temperature to a snap in about 80 minutes and was completely cured in about 2½ hours.

EXAMPLE 33

Example 31 was repeated using 0.1 g copper naphthoate solution (50% in mineral oil) in place of the manganese octoate solution. The mixture cured at room temperature to a snap in 20 seconds and was completely cured in 40 seconds.

EXAMPLE 34

Example 31 was repeated using 0.1 g ferric octoate solution (50% in mineral oil) in place of manganese octoate solution. The mixture cured at room temperature to a snap in 50 minutes and was completely cured in about 110 minutes.

EXAMPLE 35

A mixture was prepared having 100 grams of the polymer of Example 26, 1.0 g t-butyl perbenzoate and 0.25 g of cobalt octoate solution (20% in mineral oil). The mixture cured at room temperature to a snap in 65 minutes and was completely cured in 120 minutes.

Numerous modifications and variations in the practice of the invention are expected to occur to those skilled in the art upon consideration of the foregoing description and only such limitations as appear in the appended claims should be placed thereon.

What is claimed is:

1. A composition of matter consisting essentially of a material prepared by mixing
   (A) a mercaptoorganopolysiloxane consisting essentially of a combination of units selected from dimethylsiloxane units, trimethylsiloxane units, hydroxydimethylsiloxane units, units of the formula
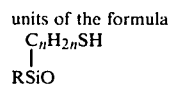

units of the formula
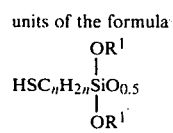

units of the formula
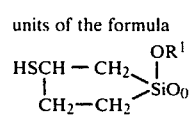

units of the formula
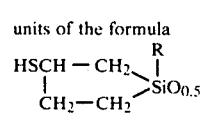

units of the formula
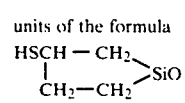

and units of the formula

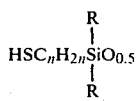

wherein: R is a monovalent radical selected from the group consisting of alkyl radicals of from 1 to 3 carbon atoms inclusive and phenyl radical; $R^1$ is methyl or ethyl; and, n has a value of from 1 to 4 inclusive, there being in said mercaptoorganopolysiloxane an average of greater than two mercapto-containing siloxane units per molecule and no more than 10 mole percent mercapto-containing siloxane units based on the total number of siloxane units in the mercaptoorganopolysiloxane;

(B) an organic peroxide in an amount of from 0.5 to about 6 parts by weight per 100 parts by weight of (A);

(C) a transition metal compound selected from among those which react to provide oxidized metal ions in the presence of (B) and reduced metal ions in the presence of (A), in an amount of from about 0.1 to about 10 parts by weight per 100 parts by weight of (A); and (D) a filler in an amount of from 0 to 200 parts by weight per 100 parts by weight of (A).

2. The composition according to claim 1 wherein said transition metal compound is selected from the group consisting of inorganic salts of iron, copper, and cobalt.

3. The composition according to claim 1 wherein said transition metal compound is selected from the group consisting of carbonyls of iron, nickel, manganese, and cobalt.

4. The composition according to claim 1 wherein said transition metal compound is a metallocene having the formula

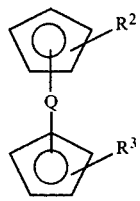

wherein Q is iron, nickel or cobalt, and $R^2$ and $R^3$ are the same or different and selected from the group consisting of hydrogen, lower ($C_1$ to $C_3$) alkyl, acetyl, carboxyl, vinyl or trimethylsilyl.

5. The composition according to claim 1 wherein said transition metal is a cyclopentadienyl carbonyl compound having the formula

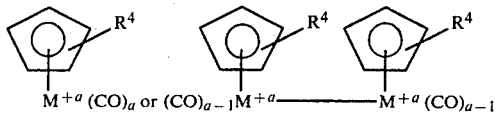

wherein M is iron, nickel or manganese, a is from 2 to 3 depending on the oxidation state of M, and $R^4$ is hydrogen, lower ($C_1$ to $C_3$) alkyl, acetyl, carboxyl, vinyl or trimethylsilyl.

6. The composition according to claim 1 wherein said transition metal compound is a salt of a carboxylic acid having the formula $$T(OR^5)_m$$

wherein T is iron, manganese, cobalt, copper or nickel, $R^5$ is a monovalent acyl radical, and m is 2 to 3 depending upon the most stable oxidation state of T.

7. The composition according to claim 1 and curable to an elastomer in which (A) consists essentially of one or more mercaptoorganopolysiloxanes selected from the group consisting of those represented by the formulas:

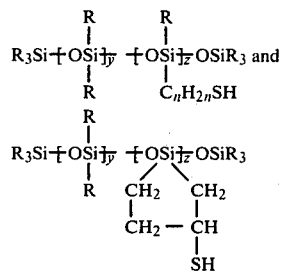

wherein $z>2$ and $y+z$ has a value of from about 18 to 1000, and (B) is present in an amount sufficient to provide at least a 1:2 mole ratio of peroxide molecules to mercapto groups in the mercaptoorganopolysiloxanes.

8. A composition according to claim 7 additionally including one or more mercaptoorganopolysiloxanes selected from the group consisting of those represented by the formulas

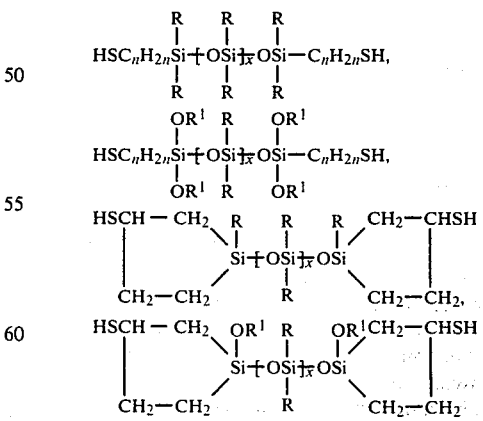

wherein x has a value of from 18 to 1000.

* * * * *

UNITED STATES PATENT AND TRADEMARK OFFICE
CERTIFICATE OF CORRECTION

PATENT NO. : 4,272,623

DATED : June 9, 1981

INVENTOR(S) : Gary R. Homan and Chi-long Lee

It is certified that error appears in the above—identified patent and that said Letters Patent is hereby corrected as shown below:

Column 3, line 21 - the phrase "mercapto-containng" should read "mercapto-containing"

Column 6, line 7 - the word "on" should read "in"

Columns 13 & 14 - Table 4 - Under Elongation (%) - the number "310" should read "810"

Column 17, line 8 - the word "has" should read "had"

Signed and Sealed this

Ninth Day of November 1982

[SEAL]

Attest:

GERALD J. MOSSINGHOFF

Attesting Officer     Commissioner of Patents and Trademarks